Aug. 3, 1937.     C. F. HAUNZ     2,088,596
STORAGE BATTERY PLATE
Filed May 8, 1933      2 Sheets-Sheet 1
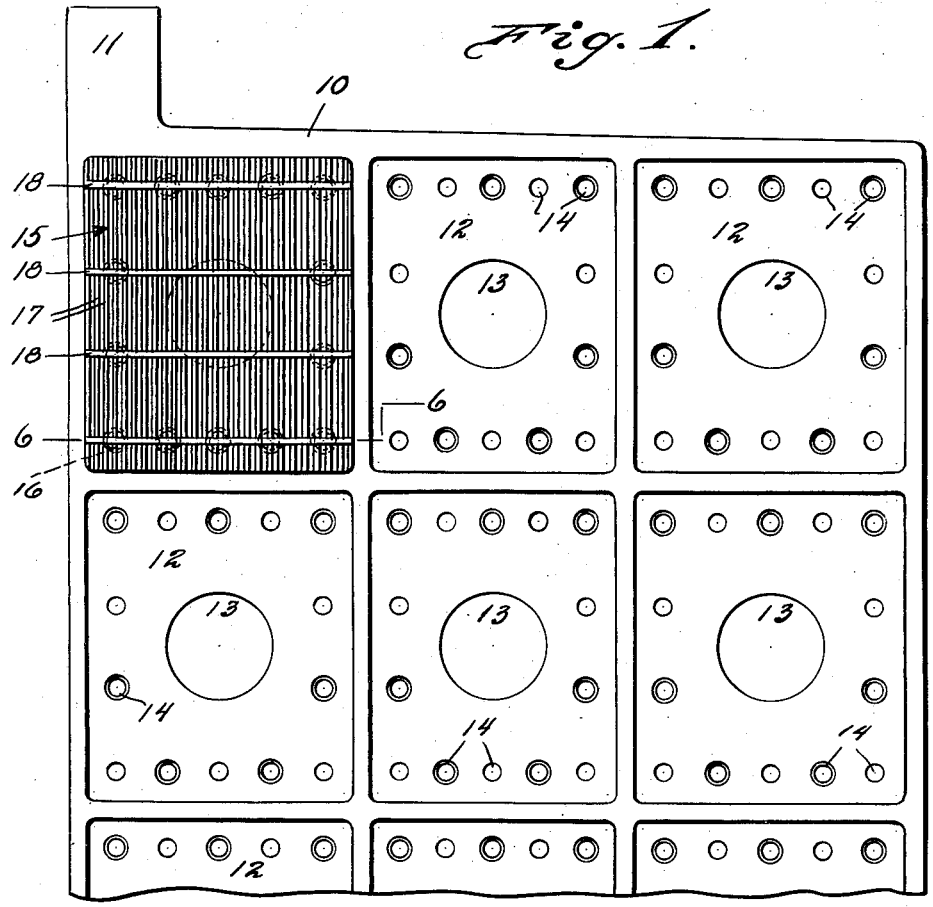
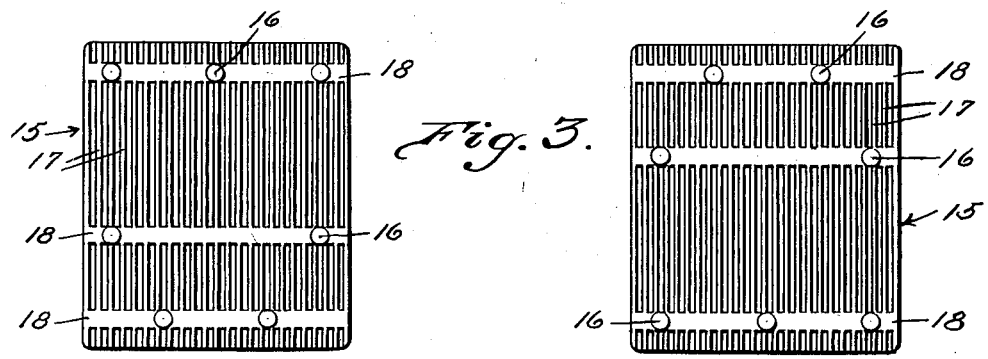
Inventor
Charles F. Haunz
By [signature]
Attorney

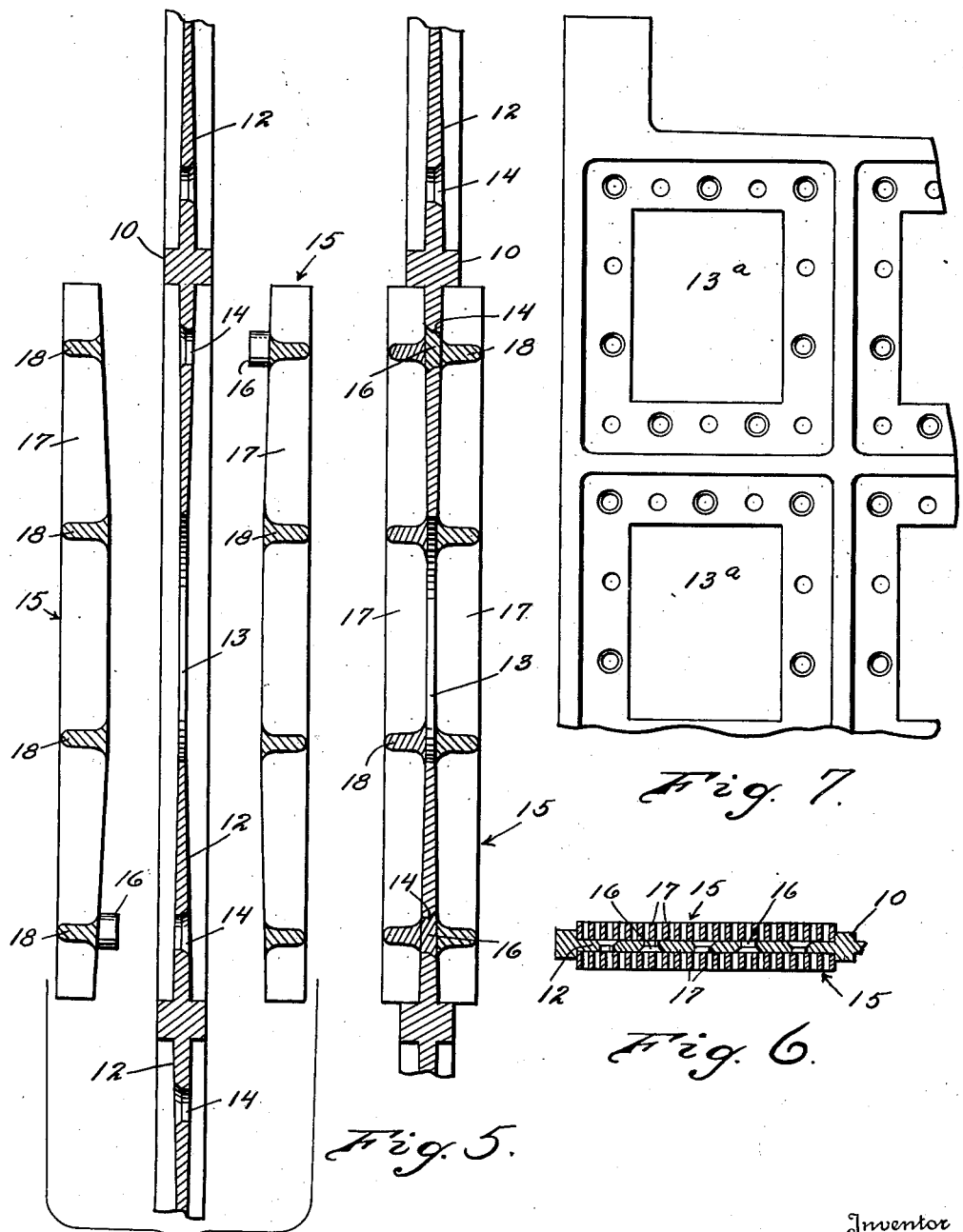

Patented Aug. 3, 1937

2,088,596

UNITED STATES PATENT OFFICE 2,088,596

STORAGE BATTERY PLATE

Charles F. Haunz, Buffalo, N. Y., assignor to The Richardson Company, Lockland, Ohio, a corporation of Ohio Application May 8, 1933, Serial No. 669,980

10 Claims. (Cl. 136—68)

This application is an improvement upon the plate disclosed and claimed in my Patent #2,023,170, issued Dec. 3, 1935.

The invention relates to storage batteries and has special, though not restricted, reference to those of the heavy duty type such for instance as are used in submarines, railway car lighting systems, air conditioning apparatus and the like, there being, however, no limitation as to the place, manner or character of the equipment where the battery is used.

The principal object of the invention, generally stated, is to provide a novel positive plate of the Planté type which will be extremely light in weight and yet which will possess great strength and rigidity so as not to buckle in service with resultant damage to or possible cutting through whatever separators are used, the latter mentioned contingency which arises in connection with ordinary plates naturally causing short circuiting of the plates and destruction of the battery.

An important object of the invention is to provide a positive plate of the Planté type which may be made in very large sizes so as to have high capacity appropriate for service in heavy duty installations and which on account of its mechanical construction will retain its plane or flat form or which will in other words be free from buckling even under the most adverse circumstances or conditions of use regardless of whether such be expected and more or less anticipated and prepared for or whether they be in the nature of emergency, unforeseen or accidental contingencies.

A more specific object of the invention is to provide a battery plate which may be broadly described as of laminated construction, all the laminae cooperating with one another mechanically to serve as or constitute mutual bracing and reinforcing means which will insure stiffness or rigidity and freedom from buckling.

A still more specific object of the invention is to provide a storage battery plate of the Planté type embodying a foundation or core of an appropriate lead alloy to which are affixed active layers or members or laminae of pure lead mechanically secured thereto and cut, sawed or otherwise treated to permit thorough and unimpeded circulation of the electrolyte.

Another object of the invention is to provide a positive storage battery plate of the Planté type which embodies a supporting foundation, frame or core of appropriate alloy provided at its sides with groups of plate sections, so-called "plugs" or portions of pure lead mechanically secured to the foundation, the arrangement being moreover such that there will be an unimpeded circulation or passage of the electrolyte of the battery through the composite plate.

A still more specific object of the invention is to provide a storage battery plate involving a foundation, frame or core of an alloy which is not in itself particularly susceptible to the chemical action of the conventional electrolyte and which carries and which has rigidly, mechanically secured thereto so-called "plugs", sections or members of pure lead which are themselves either initially, or subsequent to their attachment upon the foundation, frame or core, sawed, cut or otherwise formed to provide interstices through which the electrolyte of the battery may pass and circulate so that there will be no impedance to such circulation and so that as a consequence the battery may attain or possess the maximum efficiency in this respect.

Another object of the invention is to provide a positive storage battery plate of the Planté type characterized by its laminal grid-like construction and in which the exposed or outer sections, portions or "plugs" are so securely fastened to or substantially united with the foundation, frame or core as to avoid any possibility of loosening during whatever steps may be resorted to for completing the assembly.

The invention further contemplates a novel method and means for securing the different sections or laminae together so that the much desired rigidity, with lightness of weight, will be obtained.

To the attainment of the foregoing and other objects and advantages, the invention preferably consists in the detailed construction and the method of assembly to be hereinafter more fully described and claimed, and illustrated in the accompanying drawings in which:

Figure 1 is an elevation of a portion of a storage battery plate constructed and assembled in accordance with my invention, one panel thereof being represented in its completed or finished form, Figure 2 is an inside face view of one of the sections or portions or so-called "plugs", Figure 3 is a similar view of one of the sections disposable opposite the section disclosed in Figure 2, Figure 4 is a detail section, on a larger scale, through one of the sunken panels of the frame or foundation and showing the plate sections or "plugs" for insertion therein but detached therefrom, Figure 5 is a view similar to Figure 4 but showing the sections or "plugs" secured to the frame, foundation or core, Figure 6 is a detail cross sectional view taken on the line 6—6 of Figure 1 and showing the mode of attachment of the plate sections to the foundation or core, and Figure 7 is an elevation similar to Figure 1 but showing a modification of the core, frame or foundation.

Referring more particularly to the embodiment of the invention illustrated in the drawings, the plate is represented as comprising a foundation, frame or core 10 preferably of an alloy of lead and antimony, the exact percentage of the alloy being probably to a certain extent immaterial inasmuch as considerable variation may occur. This core or foundation may be formed as a casting, stamping or otherwise and has the usual terminal lug 11. This core or foundation member is formed throughout with a series or group of sunken panels or recesses 12 logically of rectangular shape and the material within the recesses or sunken panels at the opposite sides is preferably not of uniform thickness but decreases from the edges of the sunken panels toward the center thereof or in other words has its minimum thickness at the center of the panels, the center being, moreover, formed with an opening 13 which may be of circular shape as disclosed in Figures 1 to 6 or which may be of rectangular form as represented at 13ª in the modification shown in Figure 7, this being a detail which is more or less immaterial in so far as the fundamentals of the invention are concerned. Throughout the major portion of its area this foundation member is provided within the confines of each panel or sunken portion and outwardly of the openings 13 therein with holes 14 spaced convenient distances apart and preferably though not necessarily arranged symmetrically. Regardless of the exact mode of construction or formation of the core as well as the disposition or arrangement of the holes therein, it is intended that the latter be tapered, the larger ends, preferably of alternate ones thereof, being at one side and the larger ends of the others being at the opposite side as is very clearly illustrated in Figures 4 and 5. This can all be done very conveniently by a casting method.

Disposed against the sides of this core or foundation member and corresponding in size and shape to the sunken panels or recesses 12 are plates, sections, members or "plugs" 15 preferably of pure lead or at least substantially pure lead in the sense that the material must be free from any substances which might be deleterious on account of reaction with the electrolyte. Each plate or section 15 is formed with a series of projections 16 of a size and shape to be received within the openings 14 for the purpose of serving as retaining means. The projections 16 on one plate are staggered with respect to those on the opposite one, the intention and arrangement being such that the projections on each plate may be introduced through the smaller ends of the holes 14. The alternating arrangement of the oppositely tapered holes carries out this idea in a very simple manner as shown in Figures 4 and 5. It might be mentioned at this point that it is probably immaterial whether the projections be formed by casting, stamping or any other method. It is of course to be understood that the holes 14 in the foundation or core might be formed by casting, stamping or drilling, this being likewise immaterial in so far as the essential features of the invention are concerned. As assembly of the component parts, that is to say the sections 15 within the sunken panels or recesses 12, contemplates upsetting the projections 16 so that they will completely fill the holes 14, it is probably advisable, even if not absolutely necessary, to make the projections 16 slightly longer than the thickness of the central core or foundation member so as to provide additional metal for filling the larger or beveled ends of the holes.

In view of the fact that free circulation of the electrolyte is absolutely necessary in order to obtain or attain maximum efficiency, it is requisite that the sections or members 15 be either perforate, reticulated or foraminous and with this end in view they are here represented as being of a grid-like form. In actual practice each member 15 may consist of a series of strips 17 between which are interposed spacers 18, the whole assembly being "burned" together by a torch or other conventional means familiar to batterymen, or if such is desired it is conceivable that each member 15 may initially be a solid piece of metal, cut or sawed by means of an appropriate tool to define kerfs separating the portions 17. It is of course easily understood how a pantograph arrangement could be devised, for instance similar to key cutting machines, for forming the slots or kerfs in these members in accordance with a predetermined design, it being more or less inconsequential whether the material be actually cut out as would be the case in the event of sawing or whether it be simply displaced or burred as would be the case in the event of simple cutting. In other words it makes no difference whether the members 15 be cut, stamped, sawed or otherwise treated provided that they are in their ultimate condition of grid-like form so as to permit free passage of the battery electrolyte through them. It likewise makes no difference whether the projections 16 be formed integrally with the members 15 initially or whether they be separate elements secured thereto by "burning", brazing or any other method subsequent to whatever treatment is resorted to for making the members 15 of grid-like form. For obvious reasons it is necessary that the projections 16 be located at, adjacent or opposite to the elements 18 in order to provide sufficient stiffness, rigidity and strength to withstand whatever pressure may be necessary for effecting assembly of the parts.

Assuming that the foundation has been prepared in the manner set forth and provided with the holes 14 in the sunken panels or depressed portions, it will be seen that the members 15 are disposed against opposite sides of the foundation in such position that they will register with the sunken panels, the projections 16 passing through the holes 14. Pressure is then applied to opposite sides by any appropriate means and the result will be that the material at the ends of the projections 16 will be forced outwardly or upset so as to fill the tapered or beveled ends of the openings 14, thereby firmly uniting the members or sections 15 to the foundation or core and defining a construction wherein it will be absolutely impossible for the sections or members 15 to become displaced. Moreover this will provide a thorough and adequate electrical continuity so that to all intents and purposes the separate pure lead sections or plates 15 will be an integral part of the foundation, frame or core.

While it is stated that the projections 16 are formed on the members 15 and pass simply through the central core or foundation, it should be considered that alternative plans might be resorted to as a series of rivet-like elements could be provided passing entirely through the assembly and having upset ends, this being considered merely a colorable variation not requiring illustration. The important feature is to provide a strong mechanical as well as electrical connection between the parts.

The final step in the preparation of the plate is of course the electro-chemical one of "forming" it so as to render it active but this need not be gone into as the present invention is not concerned with subsequent treatment but only with the mechanical construction and method of production.

From the foregoing description and a study of the drawings it will be apparent that there has been thus provided a very simply constructed and consequently inexpensive positive plate of the Planté type which will be light in weight, rugged in construction, and which will additionally possess the important characteristic of stiffness and mechanical resistance to any buckling tendencies even under the most adverse conditions of use. A battery embodying plates constructed in accordance with this invention should have a much longer life than one employing plates of ordinary type in that freedom from buckling will avoid damage to and possible cutting through whatever separators are interposed between successive plates. It is thought from the above that the construction, mode of assembly and advantages will be readily apparent to one skilled in the art without further explanation.

While there have been shown and described preferred embodiments of the invention, it should be understood that the right is reserved to make numerous variations and modifications in so far as the details are concerned provided such variations constitute no departure from the salient features of the invention and the underlying principles as defined by the claims.

Having thus described the invention, what I claim is:

1. A storage battery plate comprising a current conducting, foundation member having a plurality of relatively broad, shallow depressions in each face thereof, a grid-like plate section disposed in each of said depressions, and means anchoring the peripheral marginal portion of each plate section to said member, the remaining portions of the plate sections being unanchored, the depressions in one face of said member being aligned with those in the opposite face of said member, and the common wall having a thickness greater at its peripheral margin than in its central zone, said member being also apertured from face to face to facilitate the circulation of electrolyte from face to face thereof.

2. A storage battery plate comprising a current conducting, foundation member having a plurality of relatively broad, shallow depressions in each face thereof, a foraminous grid-like plate section disposed in each of said depressions, and means anchoring the peripheral marginal portion of each plate section to said member, each depression becoming progressively deeper toward the central portion thereof from the periphery, and said grid-like sections becoming progressively thicker toward the center thereof from the periphery.

3. A storage battery plate comprising a current conducting, foundation member having a plurality of relatively broad, shallow depressions in each face thereof, a grid-like plate section disposed in each of said depressions, and means anchoring the peripheral marginal portion of each plate section to said member, each depression becoming progressively deeper toward the central portion thereof from the periphery, and said grid-like sections becoming progressively thicker toward the center thereof from the periphery, and said member being apertured from face to face so as to facilitate the circulation of electrolyte through the member from face to face.

4. A storage battery plate comprising a current conducting, foundation member approximately co-extensive in length and width to that of the desired, completed plate, and having a plurality of relatively broad shallow depressions in opposite faces thereof, a foraminous grid-like plate section disposed in and substantially filling each of said depressions, each section being of greater thickness than the depth of said depressions, and means anchoring the marginal portion of each plate section to said member, leaving the central area unanchored, said member being apertured in each depression to facilitate the circulation of electrolyte from face to face of said member.

5. A storage battery plate comprising a current conducting, foundation member having a length and width approximately equal to the desired, completed plate, said member having relatively broad shallow depressions in each face thereof with the depressions in one face aligned with those in the opposite face, the common bottom wall of each pair of aligned depressions being provided with a plurality of apertures along the marginal portion of said common wall, a foraminous grid-like plate section disposed in each of said depressions and having a plurality of studs extending therefrom and anchored individually in a part of said apertures in the bottom wall of that depression, leaving the central zone of each section unanchored, said bottom wall in each depression being also apertured within said marginal portion to facilitate the circulation of electrolyte through said member from face to face.

6. A storage battery plate comprising a current conducting, foundation member having a length and width approximately equal to the desired, completed plate, said member having relatively broad shallow depressions in each face thereof with the depressions in one face aligned with those in the opposite face, a grid-like plate section in each depression, each section being formed of spaced strips united at intervals by interponents, the marginal portion of the common bottom wall between each pair of aligned depressions being provided with a plurality of tapered passages, part of the passages being tapered in one direction and interspersed between the other passages which are tapered in the opposite direction, studs carried by each element at the junctions of the interponents with the strips, the studs of each element entering those passages of said member which diverge away from the depression in which that section is disposed and being upset in those passages so as to anchor each plate section to the common bottom wall of the said member separately from the plate section in the aligned depression on the opposite face, the studs of each plate section after passing through the common bottom wall of each pair of aligned depressions, abutting against the plate section in the other face of the member at the junction between interponents and strips of that plate section, whereby when plate sections are assembled in said depressions and forced toward one another fully into the depressions, each section will upset the ends of the studs from the other section and anchor the sections effectively to said member.

7. A storage battery plate comprising a current conducting foundation member, plate-like in form and having in each face thereof a plurality of relatively broad shallow depressions separated from one another by ribs, a grid-like lead plate section disposed in each of said depressions and anchored to said member along the marginal portion of said section, each grid section being thicker in its interior area than at its marginal portion to resist buckling.

8. A storage battery plate comprising a current conducting foundation member, plate-like in form and having in each face thereof a plurality of relatively broad shallow depressions separated from one another by ribs, a grid-like lead plate section disposed in each of said depressions and anchored to said member along the marginal portion of said section, each grid section being thicker in its interior area than at its marginal portion to resist buckling, the depressions in one face being aligned with those in the opposite face of said member, and the common bottom wall between each pair of aligned depressions being thinner centrally than at its marginal portion to make the depressions deeper centrally than at the marginal portion, which deeper portion of each depression will receive the thicker portion of the plate section that is disposed in that depression.

9. A storage battery plate comprising a foundation frame of antimonious lead of substantially the size desired for a storage battery plate, the said frame having its opposite faces formed with shallow depressions, foraminous members disposed in said depressions and members carried by and projecting from the inner faces of said members and entering into said frame for securing the members individually thereto, said frame having relatively large sized openings therethrough in the bottoms of said depressions for permitting circulation of battery electrolyte through said frame and said foraminous members.

10. A secondary battery electrode comprising a current conducting foundation member having a plurality of relatively broad and shallow depressions, foraminous plate sections located in said depressions, said plate sections having anchoring means passing into the body of said foundation members for holding said sections in place, and said foundation members being perforated in said depressions so as to permit circulation of electrolyte through said foundation members and said foraminous plate sections.

CHARLES F. HAUNZ.